(12) United States Patent
Nishibayashi et al.

(10) Patent No.: US 12,523,721 B2
(45) Date of Patent: Jan. 13, 2026

(54) DIAMOND MAGNETIC SENSOR UNIT AND DIAMOND MAGNETIC SENSOR SYSTEM

(71) Applicant: SUMITOMO ELECTRIC INDUSTRIES, LTD., Osaka (JP)

(72) Inventors: Yoshiki Nishibayashi, Osaka (JP); Hiromi Nakanishi, Osaka (JP); Hiroshige Deguchi, Kyoto (JP); Tsukasa Hayashi, Kyoto (JP); Natsuo Tatsumi, Kyoto (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 174 days.

(21) Appl. No.: 18/273,089

(22) PCT Filed: Jan. 26, 2022

(86) PCT No.: PCT/JP2022/002764
§ 371 (c)(1),
(2) Date: Jul. 19, 2023

(87) PCT Pub. No.: WO2022/163677
PCT Pub. Date: Aug. 4, 2022

(65) Prior Publication Data
US 2024/0302460 A1 Sep. 12, 2024

(30) Foreign Application Priority Data
Jan. 27, 2021 (JP) ................................. 2021-010936

(51) Int. Cl.
*G01R 33/26* (2006.01)
*G01R 33/07* (2006.01)

(52) U.S. Cl.
CPC .......... *G01R 33/26* (2013.01); *G01R 33/075* (2013.01)

(58) Field of Classification Search
CPC .............................. G01R 33/26; G01R 33/075
See application file for complete search history.

(56) References Cited

U.S. PATENT DOCUMENTS

2015/0276754 A1  10/2015  Shirakawa et al.
2016/0216341 A1*  7/2016  Boesch ............... G01R 33/032
(Continued)

FOREIGN PATENT DOCUMENTS

CN  108254708 A  *  7/2018  ........... G01R 33/032
JP  2016-505494 A  2/2016
(Continued)

OTHER PUBLICATIONS

Wickenbrock et. al., Microwave-free magnetometry with nitrogen-vacancy centers in diamond, appl. Phys. lett., (Year: 2016).*
(Continued)

*Primary Examiner* — G. M. A Hyder
(74) *Attorney, Agent, or Firm* — Renner, Otto, Boisselle & Sklar, LLP (57) ABSTRACT

A diamond magnetic sensor unit includes: a sensor part that includes a diamond having a color center with electron spin; an excitation light irradiation part that irradiates the diamond with excitation light; and a detection part that detects radiated light from the color center of the diamond, wherein the detection part detects the radiated light caused by irradiation of the diamond with the excitation light by the excitation light irradiation part without the diamond being irradiated with electromagnetic waves, and a conductive member that is disposed 10 mm or more apart from the sensor part, and transmits the electromagnetic waves can be included.

18 Claims, 6 Drawing Sheets

(56) References Cited

U.S. PATENT DOCUMENTS

2016/0348277 A1* 12/2016 Markham ............. H01L 21/042
2020/0057117 A1*  2/2020 Nishibayashi ..... G01R 33/0017
2022/0307997 A1*  9/2022 Meijer ................. G01R 33/032

FOREIGN PATENT DOCUMENTS

| | | |
|---|---|---|
| JP | 2016-101473 A | 6/2016 |
| JP | 2016-539900 A | 12/2016 |
| JP | 2017-67650 A | 4/2017 |
| JP | 2017-146158 A | 8/2017 |
| JP | 2017-162910 A | 9/2017 |
| JP | 2018-136316 A | 8/2018 |
| JP | 2018-151598 A | 9/2018 |
| JP | 2019-138772 A | 8/2019 |
| JP | 2019-211271 A | 12/2019 |
| JP | 2020-8298 A | 1/2020 |
| WO | 2014/058012 A1 | 4/2014 |
| WO | 2014/090662 A1 | 6/2014 |
| WO | 2015/071487 A1 | 5/2015 |

OTHER PUBLICATIONS

Machine Translation of CN-108254708A (Year: 2018).*
Arne Wickenbrock, et al., "Microwave-free magnetometry with nitrogen-vacancy centers in diamond", Applied Physics Letters 109, 053505 (2016) (cited in specification).
J-P. Tetienne, et al., "Magnetic field-dependent photodynamics of single NV defects in diamond: an application to qualitative all-optical magnetic imaging," New J. Phys. 14, 103033 (2012) (cited in specification).
L.T. Hall, et al., "Detection of nanoscale electron spin resonance spectra demonstrated using nitrogen-vacancy centre probes in diamond," Nat. Commun. 7, 10211 (2016) (cited in specification).
Huijie Zheng, et al., "Microwave-free vector magnetometry with nitrogen-vacancy centers along a single axis in diamond", ARXIV. Org. Cornell University Library, Apr. 8, 2019, 21 pages.
Marcis Auzinsh, et al., "Hyperfine level structure in nitrogen-vacancy centers near the ground-state level anticrossing", ARXIV. Org. Cornell University Library, May 3, 2018, 15 pages.

* cited by examiner

DIAMOND MAGNETIC SENSOR UNIT AND DIAMOND MAGNETIC SENSOR SYSTEM

TECHNICAL FIELD

The present disclosure relates to a diamond magnetic sensor unit, and a diamond magnetic sensor system. The present application claims the priority based on Japanese Patent Application No. 2021-010936 filed on Jan. 27, 2021. The entire description in this Japanese Patent Application is incorporated herein by reference.

BACKGROUND ART

Figure 1:
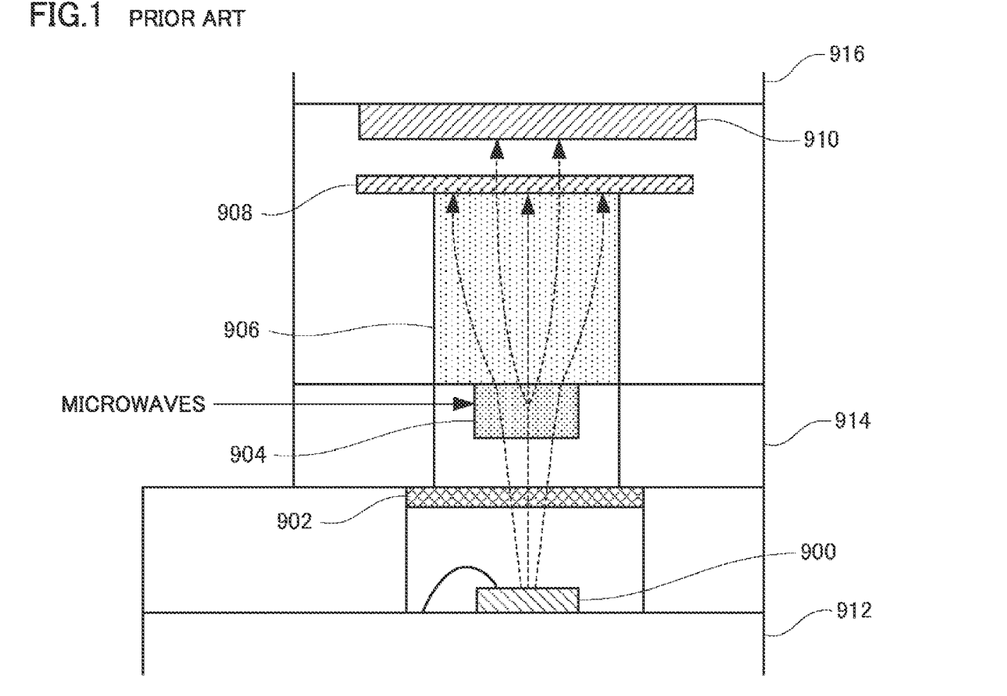
FIG. 1 is a sectional view showing a conventional microscope that uses the NV center of a diamond.

Sensors that use NV centers of diamonds have been known. In a case of using the NV center of a diamond in combination with a microscope, a configuration as shown in FIG. 1 is adopted, for example. That is, an LED 900 disposed on a substrate 912 emits green light for exciting the NV center of a diamond 904. The emitted light passes through an SPF (Short Pass Filter) 902, and subsequently enters diamond 904 disposed on a substrate 914. Accordingly, electrons at the NV center are brought into an excited state. When the excited electrons return to the original ground state, red fluorescent light is emitted from diamond 904. The fluorescent light is collected by a lens 906, passes through an LPF (Long Pass Filter) 908, and subsequently, is detected by a photodiode 910 disposed on a substrate 916. Diamond 904 is irradiated by microwaves generated by an external device (not shown). Accordingly, a resonant state with a state in a different spin state is achieved, and excitation is made, and thus the intensity of the red fluorescent light from diamond 904 is changed. The change is detected by photodiode 910. Lens 906 may have a lens structure of a high-performance optical microscope, or have a simple lens configuration.

Patent Literature 1 described below discloses a scanning probe microscope that uses the NV center of a diamond (i.e., a frequency modulation atomic force microscope (FM-AFM)). Patent Literature 2 described below discloses a magnetic field detection device that uses the NV center of a diamond.

NPL 1 described below discloses an experimental apparatus that irradiates a diamond including an NV center with excitation light, without irradiation with microwaves, and detects photoluminescence (hereinafter called PL) radiated from the NV center. The experimental apparatus includes an electromagnet for applying a sweeping magnetic field and a perturbed magnetic field at a predetermined frequency to the diamond. When in a state where the sweeping magnetic field and the perturbed magnetic field are applied to the diamond, irradiation with the excitation light is performed, and PL is detected, the intensity of PL is changed depending on an external magnetic field applied to the NV center.

CITATION LIST

Patent Literature

PTL 1: Japanese Patent Laying-Open No. 2017-67650
PTL 2: Japanese Patent Laying-Open No. 2018-136316

Non Patent Literature

NPL 1: Arne Wickenbrock, et al., "Microwave-free magnetometry with nitrogen-vacancy centers in diamond", Applied Physics Letters 109, 053505 (2016)
NPL 2: J-P. Tetienne, L. Rondin, P. Spinicelli, M. Chipaux, T. Debuisschert, J-F. Roch, and V. Jacques, "Magnetic-field-dependent photodynamics of single NV defects in diamond: an application to qualitative all-optical magnetic imaging," New J. Phys. 14, 103033(2012)
NPL 3: L. T. Hall, P. Kehayias, D. A. Simpson, A. Jarmola, A. Stacey, D. Budker, and L. C. L. Hollenberg, "Detection of nanoscale electron spin resonance spectra demonstrated using nitrogen-vacancy centre probes in diamond," Nat. Commun. 7, 10211(2016)

SUMMARY OF INVENTION

A diamond magnetic sensor unit according to an aspect of the present disclosure includes: a sensor part that includes a diamond having a color center with electron spin; an excitation light irradiation part that irradiates the diamond with excitation light; and a detection part that detects radiated light from the color center of the diamond, wherein the detection part detects the radiated light caused by irradiation of the diamond with the excitation light by the excitation light irradiation part without the diamond being irradiated with electromagnetic waves, and a conductive member that is disposed 10 mm or more apart from the sensor part, and transmits the electromagnetic waves can be included.

A diamond magnetic sensor system according to another aspect of the present disclosure includes: the diamond magnetic sensor unit described above; an application part; and a control part that controls the excitation light irradiation part, the detection part, and the application part, wherein the control part causes the application part to irradiate the diamond with the alternating-current magnetism, magnetic field, potential and electric field patterns in a temporally combined manner, along with the excitation light.

DETAILED DESCRIPTION

Problem to be Solved by the Present Disclosure

For the apparatuses disclosed in PTLs 1 and 2, the diamond including the NV center is required to be irradiated with microwaves. Accordingly, a microwave generation device, a microwave irradiation coil, and a mechanism that transmits microwaves to the microwave irradiation coil disposed adjacent to the diamond are required, which causes a problem of increase in cost.

In a case of using a sensor for high-voltage equipment, such as power equipment, a high voltage and a high current are instantaneously caused by partial electrical discharge or the like, and accompanying strong electromagnetic waves are also caused. If a conductive member, such as a coil for irradiating microwaves, is present adjacent to the diamond, an eddy current occurs there, which affects the detection accuracy of a sensor. Consequently, it is preferable that no conductive member be present adjacent to the diamond. There is a possibility that a light emitting element and a light receiving element are damaged by electrical discharge.

An experimental apparatus disclosed in NPL 1 collects radiated light from a diamond (i.e., NV center) by a lens, and is input into a photodiode via a dichroic mirror, and an output signal (i.e., an electric signal) of the photodiode is transmitted to a detection device through a cable. According to such a configuration, if the photodiode is away from the diamond, the detection sensitivity of the radiated light is reduced. Accordingly, the photodiode is required to be disposed adjacent to the diamond. Consequently, the configuration disclosed in NPL 1 cannot be adopted as a sensor used in a high-voltage environment (for example, affected by partial electrical discharge and the like).

Consequently, the present disclosure has an objective to provide a diamond magnetic sensor unit and a diamond magnetic sensor system that can accurately detect a magnetic field (a magnetic field) and the like even remotely, without being damaged in a high-voltage environment.

Advantageous Effects of the Present Disclosure

According to the present disclosure, the diamond magnetic sensor unit and the diamond magnetic sensor system can be provided that can accurately detect a magnetic field, an electric field and the like even remotely, without being damaged even in a high-voltage environment.

DESCRIPTION OF EMBODIMENTS

The details of embodiments of the present disclosure are listed and described. At least parts of the embodiments described below may be freely combined.

(1) A diamond magnetic sensor unit according to a first aspect of the present disclosure includes: a sensor part that includes a diamond having a color center with electron spin; an excitation light irradiation part that irradiates the diamond with excitation light; and a detection part that detects radiated light from the color center of the diamond, wherein the detection part detects the radiated light caused by irradiation of the diamond with the excitation light by the excitation light irradiation part without the diamond being irradiated with electromagnetic waves, and a conductive member that is disposed 10 mm or more apart from the sensor part, and transmits the electromagnetic waves can be included. Accordingly, the magnetic field can be accurately detected without damage even in a high-voltage environment of 1 kV or more.

(2) The conductive member can be disposed 50 mm or more apart from the sensor part. Accordingly, the detection accuracy can be improved without damage even in a high-voltage environment of 5 kV or more.

(3) The conductive member may be disposed 100 mm or more apart from the sensor part. Accordingly, the detection accuracy can be more improved without damage even in a high-voltage environment of 10 kV or more.

(4) The diamond magnetic sensor unit can further include an optical waveguide that transmits the excitation light and the radiated light. Accordingly, even in case electrical discharge or the like occurs in a high-voltage environment where the sensor part is disposed, the detection part and the like can be prevented from being damaged.

(5) The sensor part that includes the diamond may be entirely formed of an electrical insulating member. Accordingly, even in case electrical discharge or the like occurs in a high-voltage environment where the sensor part is disposed, the sensor part can be hindered from being damaged.

(6) The sensor part may be installed in an environment in which a voltage difference of 200 V or more can occur. Accordingly, even in case electrical discharge or the like occurs in the voltage environment of 200 V or more, the sensor part can be avoided from being damaged.

(7) The sensor part may be installed in an environment in which a voltage difference of 600 V or more can occur. Accordingly, even in case electrical discharge or the like occurs in the high voltage environment of 600 V or more, the sensor part can be avoided from being damaged.

(8) The sensor part may be installed in an environment in which a voltage difference of 1100 V or more can occur. Accordingly, even in case electrical discharge or the like occurs in the high voltage environment of 1100 V or more, the sensor part can be avoided from being damaged.

(9) The sensor part can be installed in an environment in which magnetism or a magnetic field sensed by the detection part detecting the radiated light and which contains a frequency component of 1 kHz or less. Accordingly, an instantaneously, pulsatingly changing magnetic field can be detected, and abnormality, such as partial electrical discharge, can be detected.

(10) The sensor part may be installed in an environment in which magnetism or a magnetic field sensed by the detection part detecting the radiated light and which contains a frequency component of 100 Hz or less. Accordingly, in a power transmission facility and the like, an alternating-current (AC) magnetic field caused by power transmission can be adopted as a detection target, and abnormality detection in the power transmission facility and the like can be achieved.

(11) The diamond magnetic sensor unit can further include an application part that applies alternating-current magnetism, magnetic field, potential and electric field patterns in a temporally combined manner along with irradiation of the diamond with the excitation light by the excitation light irradiation part. Accordingly, the magnetic field can be accurately detected.

(12) A spin coherence time of the diamond may be less than 50 psec. Accordingly, the NV center promptly returns from the excited state to the original state. Consequently, the AC magnetic field, electric field and the like can be efficiently detected. In particular, the pulsatingly changing magnetic field, electric field and the like can be detected.

(13) A total hydrogen concentration in the diamond can be more than 0 ppm and 10 ppm or less. Accordingly, the spin coherence time T2 of the diamond can be reduced, and the NV center can promptly return from the excited state to the original state. Consequently, the AC magnetic field, electric field and the like can be efficiently detected.

(14) A total hydrogen concentration in the diamond may be more than 0 ppm and 1 ppm or less. Accordingly, the spin coherence time T2 of the diamond can be appropriately reduced, while an electron is prevented from moving from the $NV^-$ center toward the hydrogen, and the center is prevented from becoming non-functioning (becoming $NV^0$). Accordingly, the NV center promptly returns from the excited state to the original state. Consequently, the AC magnetic field, electric field and the like can be efficiently detected without reduction in detection sensitivity.

(15) Each of $NVH^-$ concentration, CH concentration, and $CH_2$ concentration in the diamond may be more than 0 ppm and 10 ppm or less. Accordingly, the spin coherence time T2 of the diamond can be reduced, and the NV center can promptly return from the excited state to the original state. Consequently, the pulsatingly changing magnetic field, electric field and the like are included, and the AC magnetic field, electric field and the like can be efficiently detected.

(16) Each of $NVH^{31}$ concentration, CH concentration, and $CH_2$ concentration in the diamond may be more than 0 ppm and 1 ppm or less. Accordingly, the spin coherence time T2 of the diamond can be appropriately reduced, while an electron is prevented from moving from the $NV^-$ center toward the hydrogen, and the $NV^-$ center is prevented from becoming non-functioning (becoming $NV^0$). Accordingly, the NV center promptly returns from the excited state to the original state. Consequently, the pulsatingly changing magnetic field, electric field and the like are included, the AC magnetic field, electric field and the like can be efficiently detected without reduction in detection sensitivity.

(17) A diamond magnetic sensor system according to a second aspect of the present disclosure includes: the diamond magnetic sensor unit described above; an application part, and a control part that controls the excitation light irradiation part, the detection part, and the application part, wherein the control part causes the application part to irradiate the diamond with the alternating-current magnetism, magnetic field, potential and electric field patterns in a temporally combined manner, along with the excitation light. Accordingly, the magnetic field can be accurately detected without damage in a high-voltage environment.

DETAILS OF EMBODIMENTS OF PRESENT DISCLOSURE

In the following embodiments, the same components are respectively assigned with the same reference numerals. Their names and functions are also the same. Consequently, the detail description about them is not repeated.

First Embodiment

Figure 2:
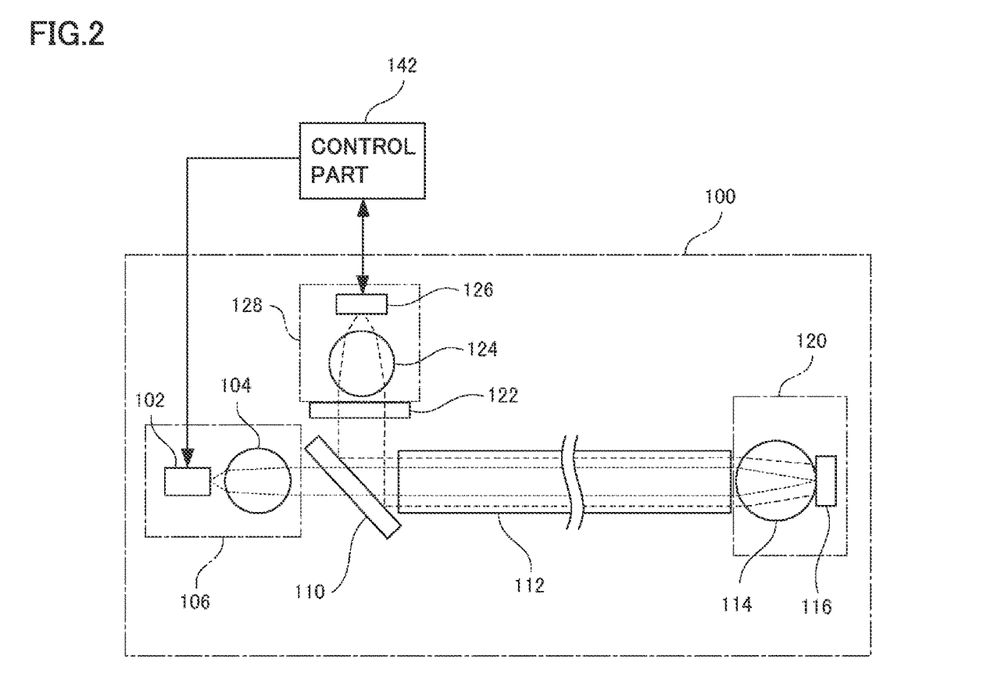
FIG. 2 is a schematic diagram showing a schematic configuration of a diamond magnetic sensor unit according to a first embodiment of the present disclosure.

Referring to FIG. 2, a diamond magnetic sensor unit 100 according to a first embodiment of the present disclosure includes an excitation light generation part 106, a fluorescent light reflection filter 110, an optical waveguide 112, a sensor part 120, an LPF 122, and a light receiving part 128. A control part 142 is disposed outside of diamond magnetic sensor unit 100.

Control part 142 includes a CPU (Central Processing Unit), and a storage part (neither is shown). After-mentioned processes performed by control part 142 are achieved by the CPU reading programs preliminarily stored in the storage part, and executing the programs.

Excitation light generation part 106 includes a light emitting element 102, and a light collecting element 104. Under control by control part 142, light emitting element 102 generates excitation light for exciting a diamond $NV^-$ center described later (hereinafter abbreviated as the NV center). In FIG. 2, an optical path of excitation light is indicated by dotted lines. For example, control part 142 supplies light emitting element 102 with a voltage for causing light emitting element 102 to emit light at predetermined timing. The excitation light is green light (i.e., with a wavelength of about 490 to 560 nm). Preferably, the excitation light is laser light. Preferably, light emitting element 102 is a semiconductor laser (e.g., the wavelength is 532 nm, which is of the radiated light). Light collecting element 104 collects the excitation light output from light emitting element 102. Light collecting element 104 is for inputting the excitation light output from light emitting element 102 in a diffused manner, as much as possible, into an after-mentioned light incident end of optical waveguide 112. Preferably, light collecting element 104 outputs parallel light collected in a smaller range than the size of the light incident end of optical waveguide 112 (for example, in a case of using an optical fiber, its core diameter (i.e., the diameter of the core)).

Fluorescent light reflection filter 110 is an element for separating the excitation light having entered from light collecting element 104, and light having been radiated from an after-mentioned diamond (i.e., fluorescent light) from each other. For example, fluorescent light reflection filter 110 is a short-pass filter that allows light having a wavelength of a predetermined wavelength or less to travel while cutting light having a wavelength longer than the predetermined wavelength (i.e., reflection), or a bandpass filter that allows light within a predetermined wavelength range to travel while cutting light out of the predetermined wavelength range (i.e., reflection). In general, the excitation light has a shorter wavelength than the fluorescent light does. Accordingly, such a configuration is preferable. Preferably, fluorescent light reflection filter 110 is a dichroic mirror having such a function.

Optical waveguide 112 includes a medium that transmits light, and bi-directionally transmits light. That is, excitation light having entered a first end disposed closer to excitation light generation part 106 is transmitted to a second end disposed closer to sensor part 120. Meanwhile, radiated light (i.e., fluorescent light) from a diamond element 116 having entered the second end is transmitted to the first end. Optical waveguide 112 is, for example, an optical fiber. To increase the energy density of the excitation light to be transmitted, it is preferable that the core diameter of the optical fiber be smaller as much as possible. On the other hand, if the core diameter is too small, the efficiency of entrance of light radiated from a light source (i.e., the light emitting element) in a diffused manner into the optical fiber is reduced. Consequently, there is an appropriate core diameter. For example, the core diameter of the optical fiber is about 80 µm or less and 1 µm or more.

Sensor part 120 includes a light collecting element 114, and diamond element 116. Diamond element 116 includes the NV center. Light collecting element 114 is disposed in contact with diamond element 116. Light collecting element 114 converges the excitation light output from optical waveguide 112, and irradiates diamond element 116 with the light. That is, control part 142 controls light emitting element 102 so as to output excitation light at predetermined timing for a predetermined time (t1). When a predetermined time (t2) elapses after output of the excitation light, control part 142 captures an output signal of light detection part 126 at predetermined timing for a predetermined time (t3), and stores the signal in the storage part.

Figure 3A:
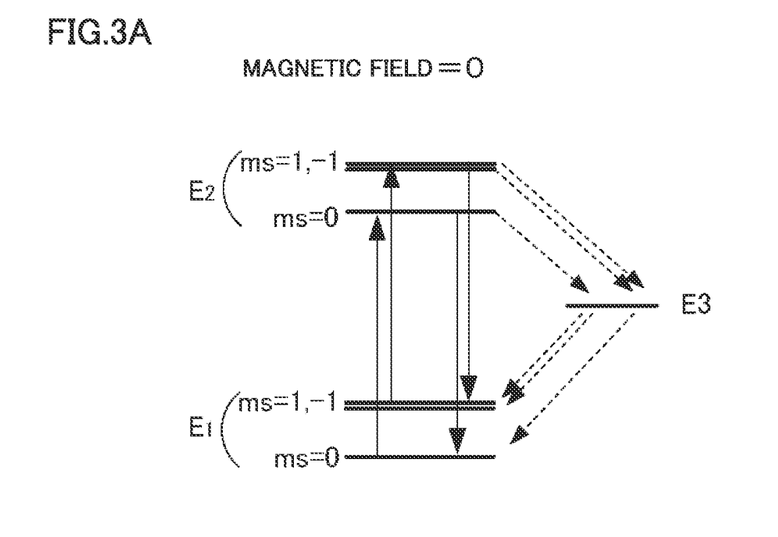
FIG. 3A shows the energy level and transition of the NV center in a case without an external magnetic field.
Figure 3B:
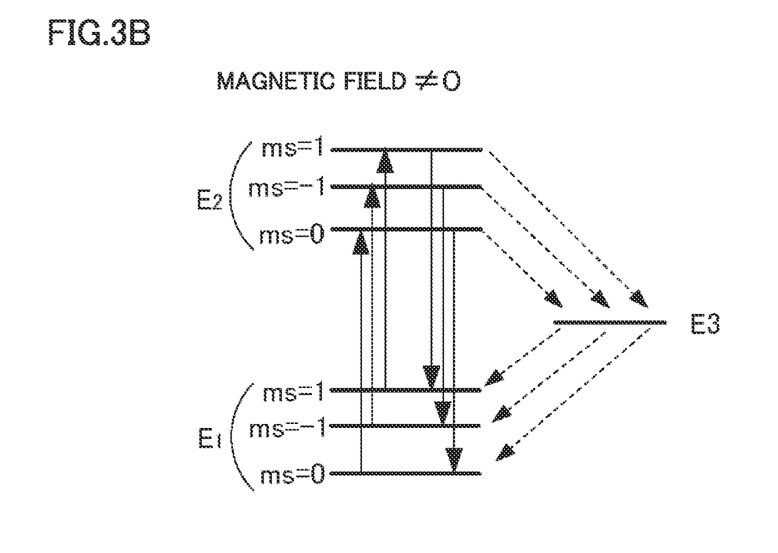
FIG. 3B shows the energy level and transition of the NV center in a case with an external magnetic field.

The NV center has a structure where a carbon (C) atom in a diamond crystal is replaced with a nitrogen (N) atom, a carbon atom that should be adjacently present is absent (i.e., a hole (V)). In a state where one electron is captured (i.e., NV$^-$), the NV center forms a spin-triplet state with magnetic quantum numbers $m_s$ of −1, 0, and +1. In a state with no external magnetic field, the energy level in a state of $m_s=\pm 1$ is degenerated as shown in FIG. 3A (for convenience sake, indicated by two line segments). In a state where an external magnetic field is present, the energy level in the state of $m_s=\pm 1$ is separated depending on the magnetic field intensity (Zeeman separation) as shown in FIG. 3B. The NV center transitions from a ground state E1 to an excited state E2, with the spin state being held, by green light having a wavelength about 490 to 560 nm (e.g., laser light of 532 nm). For example, via an intermediate state E3, light is radiated, and the state is returned to ground state E1. At this time, red light having a wavelength of about 630 to 800 nm is radiated.

According to a conventional method using microwaves, the NV center is irradiated with microwaves of about 2.87 GHz, a state of $m_s=0$ is caused to transition to a state of $m_s=\pm 1$ (i.e., electron spin resonance), subsequently irradiation with green light is performed, and excitation is caused. Thus, the transition returning to the ground state includes transition without radiation of light (i.e., fluorescent light). Accordingly, the intensity of radiated light to be observed decreases. Consequently, in the ESR (Electron Spin Resonance) spectrum, a valley (i.e., falling of the signal) is observed. The position (i.e., frequency) of the observed valley depends on an external magnetic field applied to the NV center. Accordingly, by observing the valley, the magnetic field at the position of the NV center can be detected.

Unlike this, according to the present disclosure, the NV center is irradiated with excitation light, and then radiated light is measured without irradiation with electromagnetic waves, such as microwaves, and the magnetic field at the position of the NV center is detected. Specifically, the measurement is performed in a manner similar to that disclosed in NPLs 1 to 3 and the like. The method of detecting the magnetic field without irradiation with electromagnetic waves uses the PL or decoherence property of the NV center under the influence of an external magnetic field.

For example, the intensity of PL radiated from the NV center after irradiation with excitation light exponentially attenuates with the lapse of time. The degree of attenuation depends on the external magnetic field. The stronger the external magnetic field is, the faster the attenuation is. For example, the measured value of PL can be approximated by triple exponential function with respect to the measurement time (see NPL 2). Consequently, for example, if the relationship between the external magnetic field and the degree of attenuation of the observed signal intensity of PL with respect to the diamond to be used is preliminarily derived, the external magnetic field can be detected based on the PL value measured at a predetermined time after irradiation with the excitation light, and the magnetic field intensity can be identified. Preferably, microwaves are used to accurately detect the magnetic field. However, even without use of microwaves, a magnetic field having an intensity ranging from about 10 mT to 20 mT can be thus detected. Here, it is desirable to arrange the crystal orientation of the diamond in {100} direction with respect to the direction of the external field, such as the external magnetic field, adopted as the measurement target. According to such a configuration, all the NV centers that can be formed in four directions in accordance with the sp$^3$ bonds (bonds by sp$^3$ hybrid orbitals) of the diamond isotropically sense the external field, and the contrast ratio (i.e., the S/N ratio of the signal) becomes the maximum. With any deviation from this direction, the NV center loses the magnetic sensitivity when the direction of the NV center is orthogonal to the magnetic field, for example. Consequently, only the NV center that is not orthogonal among those in the four directions has a contrast, and the sensitivity of the sensor decreases.

Note that a property called GSLAC (ground-state level anti-crossing) may be used (see NPL 1). That is, an external magnetic field of about 102.4 mT causes Zeeman sublevel degeneracy and mixing (i.e., anti-crossing) of the NV center. This can be observed as reduction in fluorescent light intensity under photoexcitation. That is, if the NV center is in a certain magnetic field, the fluorescent light of the NV center is changed, and the change can be measured. When this method is used, two electromagnets for respectively applying a static magnetic field, and a perturbed magnetic field are required. For example, an electromagnet (e.g., air core coil) for applying a sweeping magnetic field (e.g., change from 0 to 120 mT in five seconds), and an electromagnet for applying a small perturbed magnetic field (e.g., an amplitude of about 0.1 mT, and a frequency of about 100 kHz) are provided for the NV center. Processes of irradiating excitation light while applying the sweeping magnetic field and the perturbed magnetic field using a local oscillator of a lock-in amplifier to the diamond, and detecting the PL using the lock-in amplifier are repeated. Accordingly, if the magnetic field at the position of the NV center (i.e., a combined magnetic field of the sweeping magnetic field, and the external magnetic field as the detection target) is about 102.4 mT, GSLAC is observed in the PL measured signal, and the external magnetic field as the detection target can be detected using the sweeping magnetic field at the time. Alternatively, the valley of the PL measured signal observed around about 51.4 mT may be detected. The valley is due to cross relaxation between the NV center and the P1 center (a single alternative nitrogen serving as an electron donor) around the NV center. Using the sweeping magnetic field at the time, the external magnetic field as the detection target can be detected.

Alternatively, a method may be used that detects the valley of T1 relaxation time (longitudinal relaxation time) due to cross relaxation between the NV center and the P1 center around the NV center observed at about 512 G (51.2 mT) (see NPL 3). Also in this case, an electromagnet for applying the sweeping magnetic field to the diamond is required.

As for specific measurement of the PL, the measurement is performed as follows. That is, light radiated from diamond element 116 in a diffused manner (i.e., fluorescent light) is collected by light collecting element 114, and enters, as parallel light, the second end of optical waveguide 112. In FIG. 2, an optical path of radiated light is indicated by broken lines. The light input into optical waveguide 112 (i.e., fluorescent light) is transmitted through optical waveguide 112, and is output from the first end of optical waveguide 112. The light output from the first end of optical waveguide 112 (i.e., fluorescent light) is reflected by fluorescent light reflection filter 110, passes through LPF 122, is collected by a light collecting element 124, and enters light detection part 126. Accordingly, the light affected by the magnetic field at the position where diamond element 116 is disposed is detected by light detection part 126. Light detection part 126 generates an electric signal in accordance with the incident light, and outputs the signal. Light detection part 126 is, for example, a photodiode. The output signal of light detection part 126 is obtained by control part 142.

LPF 122 is a long-pass filter, allows light having a wavelength that is a predetermined wavelength or more to pass while cutting light having wavelengths shorter than the predetermined wavelength (e.g., reflection). The radiated light from diamond element 116 is red light, which passes through LPF 122. However, since the excitation light has a shorter wavelength than the red light, the excitation light does not pass through LPF 122. Consequently, the excitation light radiated from light emitting element 102 can be prevented from being detected by light detection part 126, from serving as noise, and from reducing the detection sensitivity of the radiated light (i.e., fluorescent light) from diamond element 116.

As described above, control part 142 irradiates diamond element 116 with excitation light, thus allowing the light (e.g., fluorescent light) radiated from diamond element 116 to be obtained as the electric signal output from light detection part 126. The magnetic field intensity at the position of diamond element 116 can be calculated from the observed radiated light. That is, diamond magnetic sensor unit 100 functions as a magnetic sensor. Note that diamond magnetic sensor unit 100 can be used as a sensor for detecting not only the magnetic field but also physical quantities related to the magnetic field, e.g., the magnetization, electric field, voltage, current, temperature, pressure, etc.

Through use of an optical fiber as optical waveguide 112, even if sensor part 120, and the second end of optical waveguide 112 are installed in a high-voltage facility or the like, influences due to partial electrical discharge and the like can be prevented from being applied to excitation light generation part 106 and light receiving part 128. Furthermore, excitation light generation part 106 and light receiving part 128 can be disposed remotely from the high-voltage environment, via optical waveguide 112. The magnetic field and the like can be remotely measured by diamond magnetic sensor unit 100. Sensor part 120 includes light collecting element 114 disposed between diamond element 116 and optical waveguide 112. Accordingly, the losses of the excitation light and the radiated light can be reduced, and the detection accuracy can be improved. Fluorescent light reflection filter 110, which separates the excitation light and the radiated light from each other, is provided, and transmission of the excitation light and the radiated light is performed through a single medium (e.g., optical waveguide 112). Accordingly, as described later, in comparison with a case where two media for respectively transmitting the excitation light and the radiated light are provided, the number of components can be reduced, which can achieve a simple configuration.

Note that diamond magnetic sensor unit 100 may include a conductive member that transmits electromagnetic waves that affect the NV center of the diamond. In the case where a conductive member is included, it is preferable that the conductive member be 10 mm or more apart from sensor part 120. Accordingly, the magnetic field can be accurately detected. Preferably, the conductive member is 50 mm or more apart from sensor part 120. Accordingly, the detection accuracy can be improved. More preferably, the conductive member is 100 mm or more apart. Accordingly, the detection accuracy can be more improved. Note that the actual dimensions of a lens holder, a plug of an optical fiber, a receptacle and the like are about 10 mm. Accordingly, if the separation distance is smaller than 10 mm, an influence of the non-uniformity of the electromagnetic field possibly occurs. That is, a failure of equipment possibly occurs; e.g., an origination of insulation breakdown is formed, or arc discharge occurs from a power transmission line in case abrupt potential change, such as a thunderstroke, occurs.

For example, the sensor part can be installed in equipment where a voltage difference of 200 V or more occurs in normal times (e.g., a transformer, a photovoltaic power generation facility or the like), or around the equipment. Hereinafter, the equipment and around it (i.e., a region in a predetermined range from the equipment) are collectively called "environment". For example, the sensor part may be installed in an environment where a voltage difference of 600 V or 1100 V or more occurs in normal times (e.g., a power receiving and transforming facility, a high-voltage power transmission line, a distribution line, a wind power generation facility, etc.). Even if electrical discharge or the like occurs in such an environment, the sensor part can be avoided from being damaged, and the magnetic field can be accurately detected.

Second Embodiment

Figure 4:
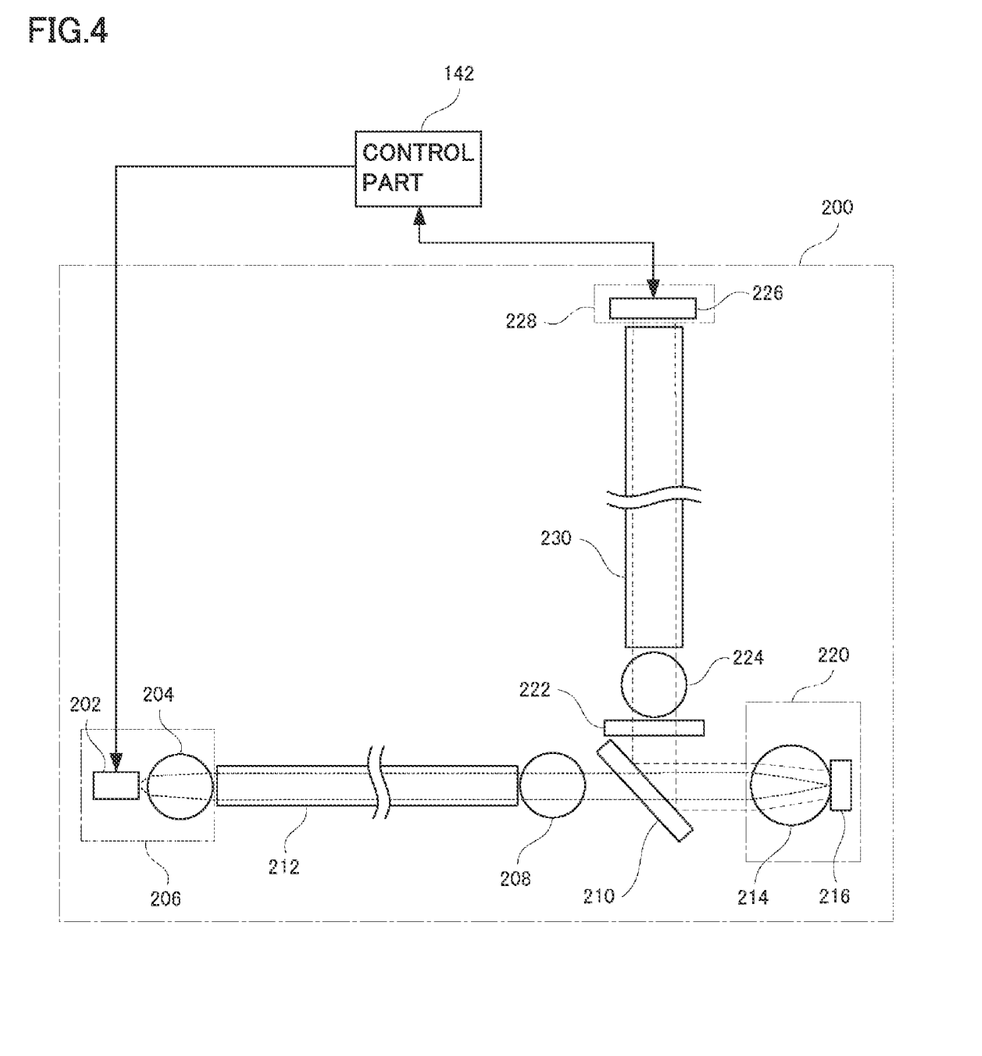
FIG. 4 is a schematic diagram showing a schematic configuration of a diamond magnetic sensor unit according to a second embodiment of the present disclosure.

In the first embodiment, the light (i.e., the excitation light and the radiated light) is bi-directionally transmitted using single optical waveguide 112. In a second embodiment, optical waveguides for respectively transmitting the excitation light for and the radiated light from a diamond element 116 are used. Referring to FIG. 4, a diamond magnetic sensor unit 200 according to the second embodiment of the present disclosure includes an excitation light generation part 206, a first optical waveguide 212, a light collecting element 208, a fluorescent light reflection filter 210, a sensor part 220, an LPF 222, a light collecting element 224, a second optical waveguide 230, and a light receiving part 228. Similar to the first embodiment, control part 142 is disposed outside of diamond magnetic sensor unit 200.

Excitation light generation part 206 includes a light emitting element 202, and a light collecting element 204. Sensor part 220 includes a light collecting element 214 and diamond element 216. Light receiving part 228 includes a light detection part 226. Light emitting element 202, light collecting element 204, fluorescent light reflection filter 210, light collecting element 214, diamond element 216, LPF 222, and light detection part 226 respectively correspond to light emitting element 102, light collecting element 104, fluorescent light reflection filter 110, light collecting element 114, diamond element 116, LPF 122, and light detection part 126 shown in FIG. 2, and similarly function. Consequently, these are briefly described. Similar to FIG. 2, in FIG. 4, an optical path of excitation light is indicated by dotted lines, and an optical path of radiated light is indicated by broken lines.

Similar to the first embodiment, under control by control part 142, light emitting element 202 generates excitation light for exciting the diamond NV center. For example, control part 142 supplies, at predetermined timing, light emitting element 202 with a voltage for causing light emitting element 202 to emit light. The excitation light is green light. Preferably, the excitation light is laser light. Preferably, light emitting element 202 is a semiconductor laser. Light collecting element 204 collects the excitation light output from light emitting element 202 in a diffused manner, and inputs the light into a light incident end of first optical waveguide 212.

First optical waveguide 212 includes a medium for transmitting light. Unlike optical waveguide 112 shown in FIG. 2, first optical waveguide 212 transmits the excitation light but does not transmit the radiated light from diamond element 216. That is, the excitation light incident on an incident end of first optical waveguide 212 disposed closer to excitation light generation part 206 is transmitted to an output end disposed closer to sensor part 220, and is output. First optical waveguide 212 is, for example, an optical fiber. The excitation light output from first optical waveguide 212 in a diffused manner is collected by light collecting element 208, and enters, as parallel light, fluorescent light reflection filter 210.

Fluorescent light reflection filter 210 is an element for separating the excitation light having entered from light collecting element 208, and light having been radiated from diamond element 216 (i.e., fluorescent light) from each other. Fluorescent light reflection filter 210 may be a dichroic mirror.

Light collecting element 214 converges the excitation light having passed through fluorescent light reflection filter 210 and entered, and irradiates diamond element 216 with the light. Light collecting element 214 is disposed in contact with diamond element 216. Diamond element 216 includes an NV center. Timing of irradiating diamond element 216 with excitation light is controlled by control part 142. Accordingly, as described above, red light (i.e., fluorescent light) is radiated from diamond element 216.

The light radiated from diamond element 216 in a diffused manner (i.e., red fluorescent light) is collected by light collecting element 214 as parallel light, and is incident on fluorescent light reflection filter 210. The light (i.e., red fluorescent light) incident on fluorescent light reflection filter 210 is reflected by fluorescent light reflection filter 210, and enters LPF 222. The radiated light (i.e., red fluorescent light) from diamond element 216 that is incident on LPF 222 passes through LPF 222, is collected by light collecting element 224, and enters an incident end of second optical waveguide 230. LPF 222 prevents the excitation light radiated from light emitting element 202 from being detected by light detection part 226, from serving as noise, and from reducing the detection sensitivity of the radiated light (i.e., fluorescent light) from diamond element 216.

Second optical waveguide 230 includes a medium for transmitting light. Second optical waveguide 230 transmits the light (i.e., the radiated light from diamond element 216) incident on an incident end from light collecting element 224, to an output end disposed closer to light receiving part 228. Light output from second optical waveguide 230 is detected by light detection part 226. Light detection part 226 is, for example, a photodiode. The output signal of light detection part 226 is obtained by control part 142.

As described above, similar to the first embodiment, control part 142 irradiates diamond element 216 with excitation light, and allowing the light (e.g., fluorescent light) radiated from diamond element 216 to be obtained as the electric signal output from light detection part 226. Consequently, diamond magnetic sensor unit 200 functions as a magnetic sensor. Diamond magnetic sensor unit 200 can be used also as a sensor for detecting not only the magnetic field but also physical quantities related to the magnetic field, e.g., the magnetization, electric field, voltage, current, temperature, pressure, etc.

Sensor part 220 does not include a conductive member transmitting electromagnetic waves, such as microwave irradiation coil. Diamond element 216, which is the main part of the sensor, and light collecting element 214 are formed of an electrical insulator. That is, sensor part 220 is entirely formed of an electrical insulating member. Consequently, even in a high-voltage environment, the sensor part itself is not damaged by partial electrical discharge and the like, the magnetic field can be accurately detected.

Through use of optical fibers as two optical waveguides (i.e., first optical waveguide 212 and second optical waveguide 230), even if sensor part 220 is installed in a high-voltage facility or the like, influences due to partial electrical discharge and the like can be prevented from being applied to excitation light generation part 206 and light receiving part 228. Furthermore, excitation light generation part 206 and light receiving part 228 can be disposed away from high-voltage environment via first optical waveguide 212 and second optical waveguide 230. The magnetic field and the like can be remotely measured by diamond magnetic sensor unit 200. Sensor part 220 includes light collecting element 214 disposed between diamond element 216, and first optical waveguide 212 and second optical waveguide 230. Accordingly, the losses of the excitation light and the radiated light can be reduced, and the detection accuracy can be improved.

Through use of the two optical waveguides (i.e., first optical waveguide 212 and second optical waveguide 230), the excitation light and the radiated light from diamond element 216 that have wavelengths different from each other can be appropriately transmitted. That is, through use of the optical fibers having core diameters in accordance with the wavelengths, the respectively suitable light collecting optical systems (i.e., light collecting element 204, 208, 214 and 224) can be designed, the light transmission efficiency can be improved, and the detection accuracy can be improved. In the case of using the optical fibers as the optical waveguides, it is preferable that the core diameter of the optical fiber (i.e., second optical waveguide 230) for transmitting the radiated light from the diamond be larger than the core diameter of the optical fiber (i.e., first optical waveguide 212) for transmitting the excitation light.

As described above, to increase the energy density of the excitation light, it is preferable that the core diameter of the optical fiber used for transmitting the excitation light preferably be small. However, if the core diameter is too small, a loss occurs when light enters the fiber from the light source. Consequently, there is an appropriate degree of the core diameter. Preferably, the core diameter of first optical waveguide 212 is 1 µm or more and 100 µm or less. On the other hand, preferably, the core diameter of the optical fiber for transmitting the radiated light from diamond element 216 is large as much as possible. Note that if the core diameter is too large, the cost increases. Preferably, the core diameter of second optical waveguide 230 is 1 µm or more and 1 mm or less.

First Modification

In the second embodiment, the excitation light and the radiated light from diamond element 216 are separated from each other using fluorescent light reflection filter 210. However, there is no limitation to this. The excitation light and the radiated light from diamond element 216 may be separated from each other using LPF.

Figure 5:
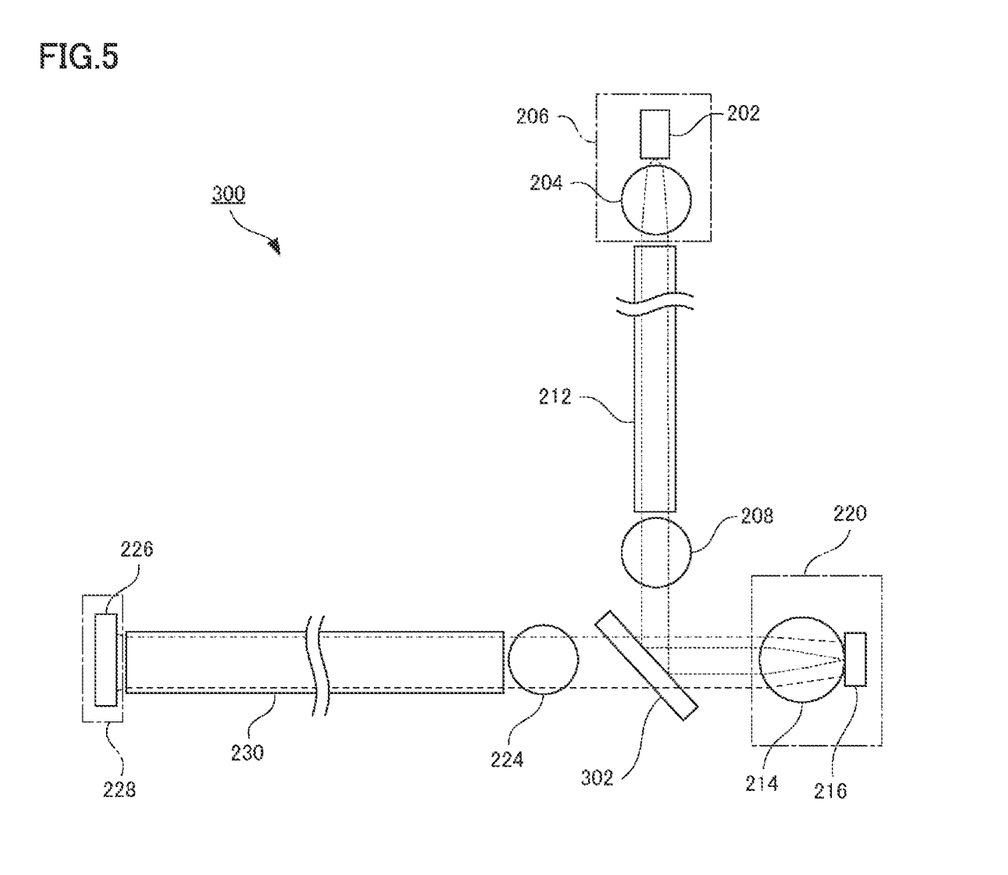
FIG. 5 is a schematic diagram showing a schematic configuration of a diamond magnetic sensor unit according to a first modification.

Referring to FIG. 5, a diamond magnetic sensor unit 300 according to a first modification separates the excitation light from light emitting element 202, and the excitation light from diamond element 216 from each other, using LPF 302. Diamond magnetic sensor unit 300 is diamond magnetic sensor unit 200 (see FIG. 4) where fluorescent light reflection filter 210 is replaced with LPF 302, and the path of occurrence and transmission of excitation light, and the path of transmission and detection of radiated light from diamond element 216 are replaced with each other. LPF 302 is a long-pass filter. In FIG. 5, configuration elements assigned the same symbols as in FIG. 4 represent the same elements in FIG. 4. Consequently, redundant description about them is not repeated. Note that similar to FIG. 4, in FIG. 5, an optical path of excitation light is indicated by dotted lines, and an optical path of radiated light is indicated by broken lines.

The excitation light caused by light emitting element 202 is collected by light collecting element 204, and enters an incident end of first optical waveguide 212. The excitation light is transmitted through first optical waveguide 212, is output from an output end of first optical waveguide 212, is collected by light collecting element 224 as parallel light, which enters LPF 302. Since the excitation light is green light, the light is reflected by LPF 302, and enters light collecting element 214.

On the other hand, the radiated light from diamond element 216 is collected by light collecting element 214 as parallel light, which enters LPF 302. The radiated light (i.e., red fluorescent light) from diamond element 216 passes through LPF 302, is collected by light collecting element 224, enters second optical waveguide 230, is transmitted through second optical waveguide 230 to light receiving part 228, and is detected by light receiving part 228. Consequently, similar to diamond magnetic sensor unit 200 in the second embodiment, diamond magnetic sensor unit 300 functions as a sensor that detects the magnetic field and the like.

Second Modification

The case where the excitation light is incident on one surface of the diamond element including the NV center, and the radiated light from the same surface is measured has been described above. However, there is no limitation to this. In a case where the diamond element including the NV center has a plurality of flat surfaces, a surface irradiated with the excitation light, and a surface where the radiated light is measured may be different from each other. The flat surface means one flat surface having a predetermined area or more. Here, the flat surface of the diamond element including the NV center means one flat surface having an area larger than a circle having a diameter of about 200 µm.

Figure 6:
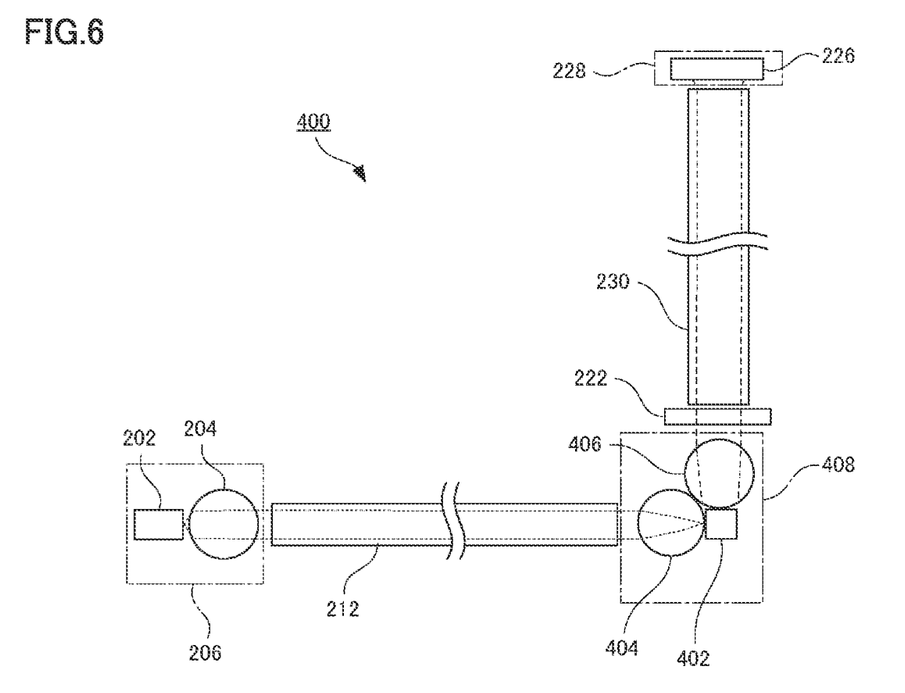
FIG. 6 is a schematic diagram showing a schematic configuration of a diamond magnetic sensor unit according to a second modification.

Referring to FIG. 6, diamond magnetic sensor unit 400 according to a second modification detects light radiated from a surface different from a surface through which the excitation light has entered a diamond element 402. Diamond magnetic sensor unit 400 is diamond magnetic sensor unit 200 shown in FIG. 4 in which sensor part 220 is replaced with sensor part 408 and from which light collecting element 208, fluorescent light reflection filter 210, and light collecting element 224 are removed. In FIG. 6, configuration elements assigned the same symbols as in FIG. 4 represent the same elements in FIG. 4. Redundant description about them is not repeated. Similar to FIG. 4, in FIG. 6, an optical path of excitation light is indicated by dotted lines, and an optical path of radiated light is indicated by broken lines.

Sensor part 408 includes diamond element 402, a light collecting element 404 and a light collecting element 406. Diamond element 402 includes the NV center, and has a plurality of flat surfaces. Diamond element 402 is formed to be a rectangular parallelepiped, for example. Light collecting element 404 is disposed in contact with one flat surface (hereinafter called a first flat surface) of diamond element 402. Light collecting element 406 is disposed in contact with a flat surface (hereinafter called a second flat surface) of diamond element 402 that is different from the first flat surface.

The excitation light transmitted from first optical waveguide 212 enters light collecting element 404, is collected by light collecting element 404, and is irradiated to the first flat surface of diamond element 402. As described above, diamond element 402 is irradiated with the excitation light at predetermined timing, thus allowing diamond element 402 to radiate light. The radiated light is radiated in all the directions. Light (i.e., red fluorescent light) emitted from the second flat surface of diamond element 402 is collected by light collecting element 406 as parallel light, enters LPF 222, passes through LPF 222, and enters an incident end of second optical waveguide 230. Subsequently, the light (i.e., red fluorescent light) radiated from the second flat surface of diamond element 402 is transmitted through second optical waveguide 230 to light detection part 226, and is detected by light detection part 226. Consequently, similar to diamond magnetic sensor unit 200 in the second embodiment, diamond magnetic sensor unit 400 functions as a sensor that detects the magnetic field and the like.

As described above, by adopting the configuration where the radiated light is detected from the surface (i.e., the second flat surface) different from the surface (i.e., the first flat surface) irradiated with the excitation light, the number of light collecting elements can be reduced, and the elements (e.g., the fluorescent light reflection filter etc.) for separating the excitation light from the radiated light from the diamond element can be omitted. Consequently, the diamond magnetic sensor unit can have a simpler configuration, and the cost can be reduced.

The case where diamond element 402 is formed to be a rectangular parallelepiped, and the first flat surface and the second flat surface are two surfaces forming an angle of 90 degrees has been described above. However, there is no limitation to this. In the case where diamond element 402 is formed to have a rectangular parallelepiped, a flat surface parallel with the first flat surface may be the second flat surface for collecting the radiated light that is a detection target. Diamond element 402 is only required to have at least two flat surfaces. There is no limitation to the hexahedron. Any shape may be adopted as that of diamond element 402.

Third Modification

Figure 7:
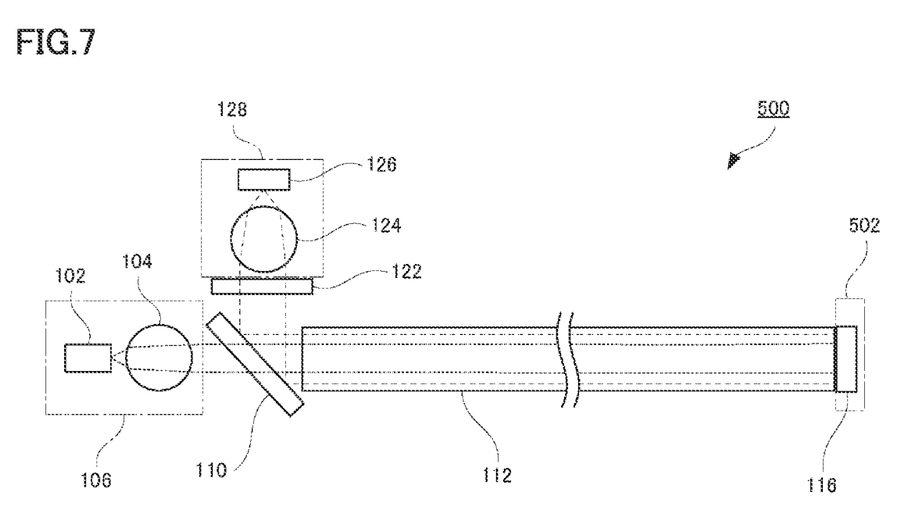
FIG. 7 is a schematic diagram showing a schematic configuration of a diamond magnetic sensor unit according to a third modification.

The case where the sensor part includes the light collecting element has been described above. However, there is no limitation to this. Referring to FIG. 7, a diamond magnetic sensor unit 500 according to a third modification is diamond sensor unit 100 shown in FIG. 2 from which light collecting element 114 is removed. That is, a sensor part 502 includes diamond element 116, but includes no light collecting element. Diamond element 116 is disposed in contact with a second end of optical waveguide 112.

Similar to diamond magnetic sensor unit 100 (see FIG. 2), when diamond magnetic sensor unit 500 irradiates diamond element 116 with the excitation light (i.e., green light) output from light emitting element 102, the NV center of diamond element 116 is excited and radiates light (i.e., red fluorescent light), and the state is returned to the original state. Consequently, by measuring the radiated light, diamond magnetic sensor unit 500 functions as a magnetic sensor. The method of measuring the magnetic field is similar to that in the first embodiment.

Sensor part 502 does not include a conductive member, such as a coil, and is entirely made of an electrical insulating member. Consequently, sensor part 502 is not damaged by electrical discharge or the like even in a case of being installed in a high-voltage facility, and can safely measure the magnetic field and the like in the high-voltage facility.

Fourth Modification

In the first and second embodiments, the case has been described where the optical waveguide transmitting the excitation light and the radiated light from the diamond element is configured using a medium that transmits light. However, there is no limitation to this. A diamond magnetic sensor unit according to a fourth modification configures an optical waveguide using a mirror. Specifically, referring to FIG. 8, a diamond magnetic sensor unit 600 includes excitation light generation part 106, sensor part 120, LPF 122, light receiving part 128, a concave mirror 602, and a convex mirror 604. Similar to the first embodiment, control part 142 is disposed outside of diamond magnetic sensor unit 600.

Figure 8:
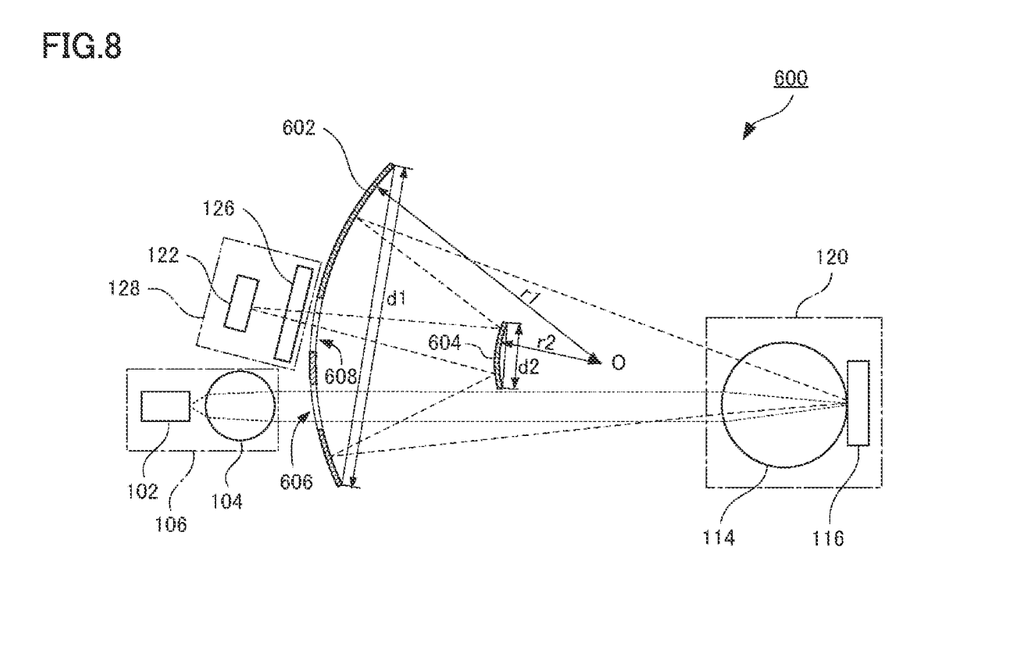
FIG. 8 is a schematic diagram showing a schematic configuration of a diamond magnetic sensor unit according to a fourth modification.

Excitation light generation part 106 includes a light emitting element 102, and a light collecting element 104. Sensor part 120 includes a light collecting element 114, and diamond element 116. Light receiving part 128 includes a light detection part 126. In FIG. 8, configuration elements assigned the same symbols as in FIG. 2 represent the same elements in FIG. 2. Consequently, redundant description about them is not repeated.

Concave mirror 602 has a shape obtained by cutting a sphere centered on a point O with a radius of r1 by a plane. The shape of an end (i.e., a cut part) of concave mirror 602 is a circle with a diameter of d1. An opening 606 for allowing excitation light from excitation light generation part 106 to pass, and an opening 608 for allowing radiated light to pass are formed in concave mirror 602. Openings 606 and 608 are, for example, circles. A curved surface facing convex mirror 604 between two curved surfaces (i.e., parts of a spherical surface) of concave mirror 602 serves as a reflection surface (i.e., a mirror surface) of radiated light. Convex mirror 604 has a shape obtained by cutting a sphere centered on point O with a radius of r2 by a plane. The shape of an end (i.e., a cut part) of convex mirror 604 is a circle with a diameter of d2. A curved surface facing concave mirror 602 between both surfaces (i.e., parts of a spherical surface) of convex mirror 604 serves as a reflection surface.

Similar to FIG. 2, in FIG. 8, an optical path of excitation light is indicated by dotted lines, and an optical path of radiated light is indicated by broken lines. Excitation light caused by light emitting element 102 is collected by light collecting element 104 as parallel light, propagates through the space, enters light collecting element 114, is collected, and irradiated to diamond element 116. That is, the space plays the role of an optical waveguide for the excitation light, and the space constitutes an optical waveguide for the excitation light. On the other hand, the radiated light from diamond element 116 is sequentially reflected by concave mirror 602 and convex mirror 604, passes through opening 608, and enters light receiving part 128. Consequently, concave mirror 602, convex mirror 604, and the space constitute an optical waveguide for radiated light. Accordingly, similar to diamond magnetic sensor unit 100 in the first embodiment, diamond magnetic sensor unit 600 functions as a sensor that detects the magnetic field and the like.

Note that the case where both concave mirror 602 and convex mirror 604 are positioned on point O has been described above. Alternatively, the centers of concave mirror 602 and convex mirror 604 may be at different positions. Furthermore, the case where the ends of concave mirror 602 and convex mirror 604 are circles (i.e., shapes obtained by cutting a sphere by a plane) has been described. However, there is no limitation to this. It is only required that surfaces of concave mirror 602 and convex mirror 604 that face each other are mirror surfaces. The shapes of ends of concave mirror 602 and convex mirror 604 may be freely selected shapes.

In the second embodiment (see FIG. 4), the first modification (see FIG. 5), and the second modification (see FIG. 6), the case where the excitation light is transmitted through optical waveguide 212, such as the optical fiber, has been described. However, there is no limitation to this. For example, diamond magnetic sensor unit 200 (see FIG. 4) and diamond magnetic sensor unit 300 (see FIG. 5) do not necessarily include optical waveguide 212 and light collecting element 208. The excitation light output from light emitting element 202 is collected by light collecting element 204, and becomes parallel light. Accordingly, light collecting element 208 is not necessarily provided. The excitation light collected by light collecting element 204 is transmitted through the space itself, and enters fluorescent light reflection filter 210 or LPF 302. Likewise, diamond magnetic sensor unit 400 (see FIG. 6) does not necessarily include optical waveguide 212. The excitation light collected by light collecting element 204 is transmitted through the space itself, and enters light collecting element 404.

The case where the diamond magnetic element including the NV center is used as the diamond sensor unit has been described above. However, there is no limitation to this. The diamond element is only required to have a color center with electron spin. The color center with electron spin is a center that forms a spin-triplet state, and emits light by excitation. The NV center is a typical example. Furthermore, it has been known that a color center with electron spin is present also at a silicon-hole center (i.e., Si—V center), germanium-hole center (i.e., Ge—V center), and tin-hole center (i.e., Sn—V center). Consequently, a diamond sensor unit may be configured using a diamond element including any of them instead of the diamond magnetic element including the NV center.

Preferably, the excitation light is laser light. It is preferable that the generation device be a semiconductor laser in terms of reduction in size. A detector for the radiated light from the diamond element may be of a vacuum tube type. However, a semiconductor detection device is preferable in terms of reduction in size.

Preferably, the optical waveguide has a two-or-more-layered coaxial structure that includes a core portion through which light passes, and a portion that is made of a material having an refractive index different from that of the core portion and is formed around the core. The core portion is not necessarily made in a form densely filled with a medium for transmitting light. Since the space itself can transmit light, the core may be hollow. Preferably, the optical waveguide is an optical fiber having a core diameter of 1 µm or more and 80 µm or less. This is because through use of the optical fiber, laser light can be relatively easily introduced to a desired position, and the diffusion at the output end of the optical fiber can be suppressed.

The light collecting element is only required to be formed of a material having a function of collecting light. For example, the element may be a lens formed of a silicon-oxide-based material (e.g., glass; an additive other than silicon oxide may be contained), or a material having a diffractive function. Preferably, the light collecting element is a lens that allows light to pass and uses a refractive phenomenon. A spherical lens, a hemispherical lens, and a Fresnel lens are preferable. In particular, in terms of the relationship between the refractive index and the spherical shape, a lens having a focal point of parallel light on a spherical surface is more preferable. This is because through use of such a lens, adjustment of the optical focal point and the optical axis becomes significantly simple, and the amount of light can be utilized as much as possible.

Preferably, in a case where the sensor part is disposed in a high-voltage environment, the optical waveguide (e.g., the optical fiber) for transmitting the excitation light and the radiated light from the diamond is disposed through insulating glass. Accordingly, the excitation light generation part and the light receiving part can be insulated from a high voltage, the devices used in the excitation light generation part and the light receiving part can be protected.

Preferably, in a case of detecting temporal change in varying magnetic field and the like with respect to AC power using the diamond sensor unit described above, the NV center of the diamond element is excited and subsequently returns from the light radiating state to the original state (i.e., the state before excitation). To achieve this, it is preferable that spin coherence time T2 of the diamond element be short. Preferably, for example, spin coherence time T2 of the diamond element is less than 50 psec. Accordingly, the NV center promptly returns from the excited state to the original state. Consequently, the AC magnetic field, electric field and the like can be efficiently detected. In particular, the pulsatingly changing magnetic field, electric field and the like can be detected. Note that the detection sensitivity is proportional to $(T2)^{-1/2}$. Accordingly, the smaller T2 is, the lower the detection sensitivity is. Consequently, when abrupt change in magnetic field variation is detected, for example, when pulse shape variation in magnetic field is detected, it is conceivable that spin coherence time T2 of the diamond element is made short as much as possible at the expense of the detection sensitivity.

Preferably, to reduce the spin coherence time, the diamond element contains impurities. In consideration of the fact that the smaller T2 is, the lower the detection sensitivity is, for example, it is preferable that the total hydrogen concentration in the diamond be higher than 0 ppm, and 10 ppm or less. Here, the concentration (ppm unit) represents the ratio of the number of atoms. Accordingly, the spin coherence time T2 of the diamond can be reduced, and the NV center can promptly return from the excited state to the original state. Consequently, the AC magnetic field, electric field and the like can be efficiently detected. Note that as the concentration of hydrogen atoms contained in the diamond increases, electrons on the NV-center side move to the hydrogen side, and the color sensor does not function (i.e., becoming $NV^0$). Consequently, it is preferable that the total hydrogen concentration in the diamond be more than 0 ppm and 1 ppm or less. Accordingly, the spin coherence time T2 of the diamond can be appropriately reduced, while an electron is prevented from moving from the NV-center toward the hydrogen, and the center is prevented from becoming non-functioning.

Preferably, each of the $NVH^-$ concentration, CH concentration, and $CH_2$ concentration in the diamond is higher than 0 ppm, and 10 ppm or less. Accordingly, the spin coherence time T2 of the diamond can be reduced, and the NV center can promptly return from the excited state to the original state. Consequently, the AC magnetic field, electric field and the like can be efficiently detected. As described above, to suppress the concentration of hydrogen atoms contained in the diamond, it is preferable that each of the $NVH^-$ concentration, CH concentration, and $CH_2$ concentration in the diamond be more than 0 ppm and 1 ppm or less. Accordingly, the spin coherence time T2 of the diamond can be appropriately reduced, while an electron on the NV-center side is prevented from moving toward the hydrogen side, and the center is prevented from becoming non-functioning.

Through use of the diamond having a short spin coherence time, the diamond magnetic sensor unit is installed in an environment where the magnetism or the magnetic field includes a frequency component of 100 Hz or less, and the magnetism or the magnetic field can be detected. For example, in a power receiving and transforming facility and the like, an AC magnetic field caused by power transmission can be adopted as a detection target, and abnormality detection in the power receiving and transforming facility and the like can be achieved. Through use of the diamond having a shorter spin coherence time, the diamond magnetic sensor unit is installed in an environment where the magnetism or the magnetic field includes a frequency component of 1 kHz or less, and the magnetism or the magnetic field can be detected. For example, an instantaneously, pulsatingly changing magnetic field can be detected, and abnormality, such as partial electrical discharge, can be detected.

The case of detecting the radiated light radiated from the diamond by irradiation with excitation light without irradiation of the diamond having the color center with electromagnetic waves has been described above. However, there is no limitation to this. The diamond may be irradiated with the excitation light, and the alternating-current (AC) magnetism, magnetic field, potential and electric field patterns may be applied in a temporally combined manner, and the radiated light radiated from the diamond may be detected. In this case, the diamond magnetic sensor unit includes an application device (e.g., an electromagnet etc.) for forming the alternating-current magnetism, magnetic field, potential and electric field patterns in a temporally combined manner. Accordingly, the magnetic field can be accurately detected.

Configuration of Example

Figure 9:
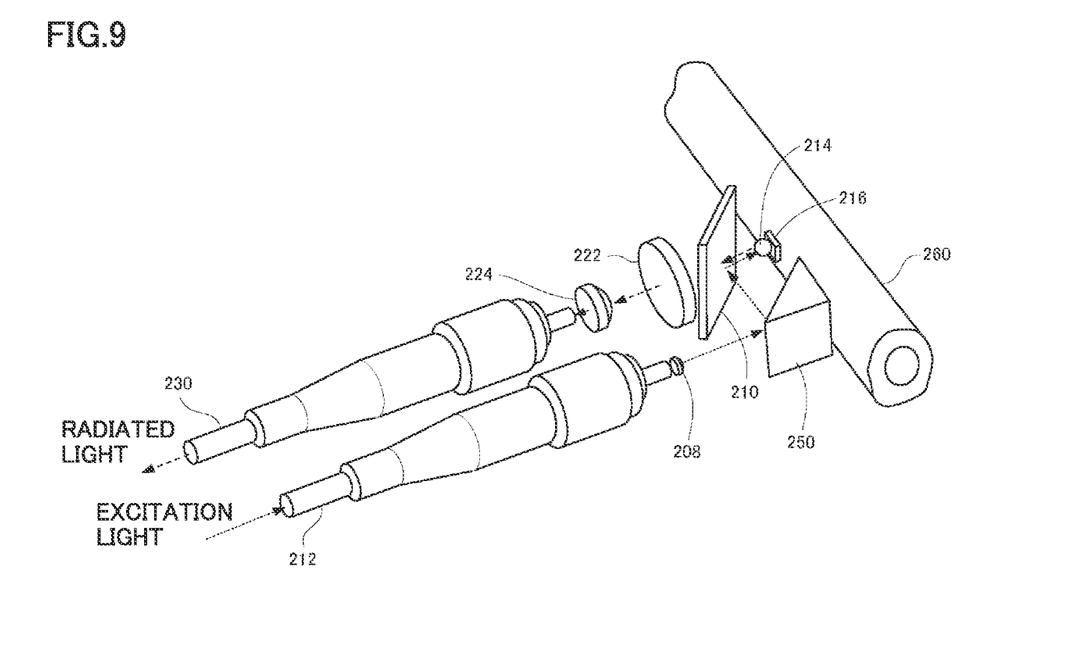
FIG. 9 is a perspective view showing an Example of the second embodiment (see FIG. 4).

An Example of the configuration shown in FIG. 4 is shown in FIG. 9. FIG. 9 shows arrangement in a case where light collecting element 214 and diamond element 216, which constitute the sensor part, are disposed adjacent to electrical wiring 260, an alternating current (e.g., 50 Hz or 60 Hz, and 30 A) is caused to flow through electrical wiring 260, and the thus caused varying magnetic field is adopted as a detection target. In FIG. 9, components corresponding to the configuration elements shown in FIG. 4 are respectively assigned symbols identical to those in FIG. 4.

For example, step-index multimode optical fibers are used as first optical waveguide 212 and second optical waveguide 230. For example, first optical waveguide 212 has a core diameter of 50 μm, and an NA (i.e., numerical aperture) of 0.2. For example, second optical waveguide 230 has a core diameter of 400 μm, and an NA of 0.5. For example, a rectangular parallelepiped diamond of 3 mm×3 mm×0.3 mm is used as diamond element 216. For example, a spherical lens having a diameter of 2 mm is used as light collecting element 214. Light collecting element 214 is brought into contact with a surface (e.g., a flat surface of 3 mm×3 mm) of diamond element 216 and is fixed. In the optical system for transmitting the excitation light, a triangular prism 250 is disposed in addition to light collecting element 208 and fluorescent light reflection filter 210, thus configuring a collimating optical system. By the collimating optical system, adjustment can be performed so that the excitation light can enter the center of light collecting element 214.

For example, a PIN-AMP (i.e., a photodiode IC including a linear current amplifier circuit) is used as light detection part 226 (see FIG. 4). The PIN-AMP is, for example, a photo IC diode S7183 or S7184 (made by Hamamatsu Photonics K.K). The photo IC diode has a photodiode sensitivity wavelength range of 300 to 1000 nm and a maximum sensitivity wavelength of 650 nm, and amplifies the photocurrent generated by the photodiode by 1300 times, and outputs the amplified signal.

The present disclosure has thus been described above by describing the embodiments. The aforementioned embodiments are only examples. The present disclosure is not limited to only the embodiments described above. The scope of the present disclosure is indicated by each claim among the claims in consideration of the representation of the detailed description of the invention, and encompasses the meanings equivalent to the words described therein, and all the changes within the scope.

REFERENCE SIGNS LIST 100, 200, 300, 400, 500, 600 Diamond magnetic sensor unit
102, 202 Light emitting element
104, 114, 124, 204, 208, 214, 224, 404, 406 Light collecting element
106, 206 Excitation light generation part
110, 210 Fluorescent light reflection filter
112 Optical waveguide
116, 216, 402 Diamond element
120, 220, 408, 502 Sensor part
122, 222, 302, 908 LPF
126, 226 Light detection part
128, 228 Light receiving part
142 Control part
212 First optical waveguide
230 Second optical waveguide
250 Triangular prism
260 Electrical wiring
602 Concave mirror
604 Convex mirror
606, 608 Opening
912, 914, 916 Substrate
900 LED
902 SPF
904 Diamond
906 Lens
910 Photodiode
E1, E2, E3 Energy level
O Point
r1, r2 Radius
d1, d2 Diameter

The invention claimed is:

1. A diamond magnetic sensor unit, comprising:
a sensor part that includes a diamond having a color center with electron spin;
an excitation light irradiation part that irradiates the diamond with excitation light; and
a detection part that detects radiated light from the color center of the diamond,
wherein the detection part detects the radiated light caused by irradiation of the diamond with the excitation light by the excitation light irradiation part without the diamond being irradiated with microwaves, and
wherein a spin coherence time of the diamond is less than 50 μsec.

2. The diamond magnetic sensor unit according to claim 1, further comprising an optical waveguide that transmits the excitation light and the radiated light.

3. The diamond magnetic sensor unit according to claim 1, wherein the sensor part that includes the diamond is entirely formed of an electrical insulating member.

4. The diamond magnetic sensor unit according to claim 1, wherein the sensor part is installed in an environment in which a voltage difference of 200 V or more can occur.

5. The diamond magnetic sensor unit according to claim 1, wherein the sensor part is installed in an environment in which a voltage difference of 600 V or more can occur.

6. The diamond magnetic sensor unit according to claim 1, wherein the sensor part is installed in an environment in which a voltage difference of 1100 V or more can occur.

7. The diamond magnetic sensor unit according to claim 1, wherein the sensor part is installed in an environment in which magnetism or a magnetic field sensed by the detection part detecting the radiated light and which contains a frequency component of 1 kHz or less.

8. The diamond magnetic sensor unit according to claim 1, wherein the sensor part is installed in an environment in which magnetism or a magnetic field sensed by the detection part detecting the radiated light contains a frequency component of 100 Hz or less.

9. The diamond magnetic sensor unit according to claim 1, further comprising an application part that applies alternating-current magnetism, magnetic field, potential and electric field patterns in a temporally combined manner along with irradiation of the diamond with the excitation light by the excitation light irradiation part.

10. A diamond magnetic sensor system, comprising:
the diamond magnetic sensor unit according to claim 9; and
a control part that controls the excitation light irradiation part, the detection part, and the application part, and
wherein the control part causes the application part to irradiate the diamond with the alternating-current magnetism, magnetic field, potential and electric field patterns in a temporally combined manner, along with the excitation light.

11. The diamond magnetic sensor unit according to claim 1, wherein a total hydrogen concentration in the diamond is more than 0 ppm and 10 ppm or less.

12. The diamond magnetic sensor unit according to claim 1, wherein a total hydrogen concentration in the diamond is more than 0 ppm and 1 ppm or less.

13. The diamond magnetic sensor unit according to claim 1, wherein each of $NVH^-$ concentration, CH concentration, and $CH_2$ concentration in the diamond is more than 0 ppm and 10 ppm or less.

14. The diamond magnetic sensor unit according to claim 1, wherein each of $NVH^-$ concentration, CH concentration, and $CH_2$ concentration in the diamond is more than 0 ppm and 1 ppm or less.

15. A diamond magnetic sensor unit, comprising:
a sensor part that includes a diamond having a color center with electron spin;

an excitation light irradiation part that irradiates the diamond with excitation light; and a detection part that detects radiated light from the color center of the diamond, wherein the detection part detects the radiated light caused by irradiation of the diamond with the excitation light by the excitation light irradiation part, a conductive member that is disposed 10 mm or more apart from the sensor part, and transmits electromagnetic waves that affect the color center of the diamond, and wherein a spin coherence time of the diamond is less than 50 μsec.

16. The diamond magnetic sensor unit according to claim 15, wherein the conductive member is disposed 50 mm or more apart from the sensor part.

17. The diamond magnetic sensor unit according to claim 15, wherein the conductive member is disposed 100 mm or more apart from the sensor part.

18. A diamond magnetic sensor unit, comprising:

a sensor part that includes a diamond having a color center with electron spin;

an excitation light irradiation part that irradiates the diamond with excitation light;

a detection part that detects radiated light from the color center of the diamond; and an application part that applies alternating-current magnetism, magnetic field, potential and electric field patterns in a temporally combined manner along with irradiation of the diamond with the excitation light by the excitation light irradiation part, wherein the detection part detects the radiated light caused by irradiation of the diamond with the excitation light by the excitation light irradiation part without the diamond being irradiated with microwaves.

* * * * *